United States Patent
Feeney

(10) Patent No.: US 10,405,413 B2
(45) Date of Patent: Sep. 3, 2019

(54) VISUAL TRACKING SYSTEM AND METHOD

(71) Applicant: Liam Feeney, Sligo (IE)

(72) Inventor: Liam Feeney, Sligo (IE)

( * ) Notice: Subject to any disclaimer, the term of this patent is extended or adjusted under 35 U.S.C. 154(b) by 0 days.

(21) Appl. No.: 15/735,157

(22) PCT Filed: Jun. 9, 2016

(86) PCT No.: PCT/EP2016/063225
§ 371 (c)(1),
(2) Date: Dec. 8, 2017

(87) PCT Pub. No.: WO2016/198556
PCT Pub. Date: Dec. 15, 2016

(65) Prior Publication Data
US 2018/0160507 A1 Jun. 7, 2018

(30) Foreign Application Priority Data
Jun. 9, 2015 (IE) .................................. S2015/0171

(51) Int. Cl.
*H05B 37/02* (2006.01)
*G06F 3/0481* (2013.01)

(52) U.S. Cl.
CPC ....... *H05B 37/029* (2013.01); *G06F 3/04812* (2013.01)

(58) Field of Classification Search
CPC ....... F21W 2131/205; F21W 2131/406; G06F 3/04812; H05B 37/029; H05B 37/02; A63G 31/02; F16M 11/045
See application file for complete search history.

(56) References Cited

U.S. PATENT DOCUMENTS

| | | | |
|---|---|---|---|
| 5,953,151 A * | 9/1999 | Hewlett | F21S 10/007 348/E5.142 |
| 6,412,972 B1 * | 7/2002 | Pujol | G09F 19/18 348/E5.142 |
| 2009/0009984 A1 | 1/2009 | Mangiardi | |
| 2011/0285854 A1 | 11/2011 | Laduke et al. | |
| 2015/0091446 A1 | 4/2015 | Ohta et al. | |
| 2016/0184719 A1 * | 6/2016 | D'Andrea | A63G 31/02 700/275 |

FOREIGN PATENT DOCUMENTS

| | | |
|---|---|---|
| GB | 2499123 A | 8/2013 |
| WO | 2009130521 A1 | 10/2009 |

OTHER PUBLICATIONS

PCT/EP2016/063225. International Search Report and Written Opinion (dated Oct. 20, 2016).

* cited by examiner

*Primary Examiner* — Haissa Philogene
(74) *Attorney, Agent, or Firm* — Loza & Loza, LLP; Anthony G. Smyth

(57) ABSTRACT

The present invention is directed to a user-operated spotlight system and method for lighting a performer on a stage; the user-operated spotlight system comprising a screen which displays an image of the stage and a cursor, a screen cursor positioner adapted to be operated to move the cursor on the screen, a processor connected to the screen, and, a plurality of controllable spotlights which are connected to the processor and which plurality of controllable spotlights can be moved by a user moving the cursor on the screen. The advantage of providing such a user-operated spotlight system is that a single user can operate a plurality of spotlights.

20 Claims, 6 Drawing Sheets

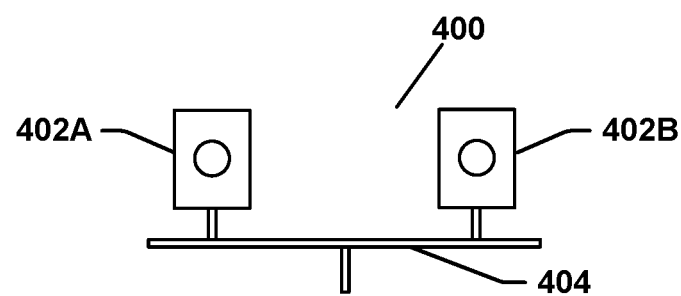
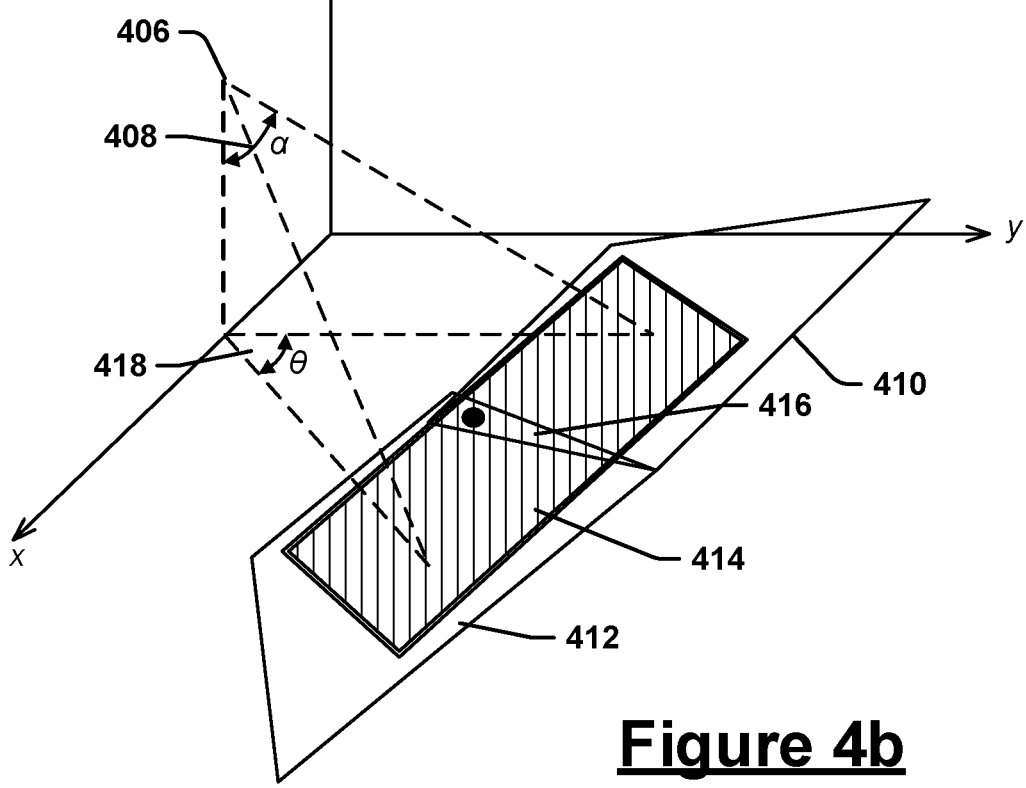
Figure 4a
Figure 4b

VISUAL TRACKING SYSTEM AND METHOD

FIELD

This invention relates to a visual tracking system and method, for example a stage lighting system and method. In particular the invention relates to visually tracking a source of performance.

BACKGROUND

In stage performances, a performer should ideally be lit from a front angle, a left-side angle, a right-side angle and a rear angle. Therefore, each performer would ideally have four lights directed towards them.

As a performer moves about the stage, these lights need to be moved in order to continue to illuminate the performer from these four angles. Such light sources are used to illuminate a moving performer. Each light source, where that light source is manually operated, will require one operator. The operator must be versed in the performers movements and be vigilant to move the light source in coordination with the performer's movements. When lighting a performer from the four angles, using the key lighting method, four operators are needed to illuminate each performer. As there could be several performers onstage at the same time, theoretically this would require tens of operators to be positioned in areas above the stage and in areas surrounding the stage area in order to operate all of the light sources. This is not practical and oftentimes there is only enough space for approximately six operators, even in the large theatres, who then must divide their time between operating different spotlights which are focussed on different performers at different times during the performance. This is undesirable as the lighting of the performers will be sub-optimal and therefore will impact on the overall performance.

For a number of years now fully automated spotlight systems have been known. Such a fully automated spotlight systems typically use radio frequency (RF) transmitters which are worn by each of the performers in order to triangulate a performer's position on the stage. Several RF receivers positioned about the edges of the stage are used to calculate the performer's approximate position on the stage by determining the strengths of the RF signal received at the RF receivers. It will be appreciated that such systems are prone to error as the accuracy of RF triangulation is not precise enough to capture small movements by the performers.

Further developments of such fully automated systems have incorporated infrared (IR) transmitters and IR receivers in order to better determine the position of the performers on the stage. Such IR-based systems are more accurate than the RF-only systems but the IR-based systems still use the RF transmitter and receivers as the primary means of performance position determination. In these IR systems, the IR transmitter and IR receiver are used as a secondary positioning system to further refine the determination of the performer's position and the IR transmitter and receiver system is also used as a backup in the case that the RF system is not operating correctly.

More recently, such fully automated systems have incorporated gyroscopes into the units that are worn by the performers in order to assist with understanding whether a performer has moved slightly in one direction, or if the performer has moved to a kneeling or prone position on the stage. Such small movement can be detected using the gyroscope, but the accuracy is not perfect and there remain issues with these types of prior art systems as discussed further hereinbelow.

Nonetheless there are still issues with these fully automated systems. For example, should a performer raised a hand to display an object, the position of the performer on the stage will not have changed however it would be best if the spot lighting could be moved slightly upwardly to better illuminate the performer's raised hand so that the audience could clearly see the object held aloft. In other circumstances, the performer may lean slightly to the left or to the right such that the performer's head may move out of the beam of the light source but the performer's waist may not have moved as they are only leaning. In this scenario, the fully automated systems may not be able to detect such movement and will not move the lights accordingly. In situations where the performer has only changed position to a small degree, fully automated spotlight systems will not have the ability to recognise or detect all of these movements and hence will not be able to move the spotlights in the appropriate manner so as to illuminate the performer correctly.

Furthermore, in other scenarios it is desirable to light specific areas of the stage at specific points even if there is no performer in the vicinity of that stage point at that time. With the fully automated systems which rely on the presence of an RF signal and/or an IR signal, it is not possible to do so. It would be necessary in such scenarios to have a dedicated light which is directed towards that area of the stage which can then be switched on and switched off as needs be during the performance. For the remaining portion of the performance this dedicated light would not be used which is an inefficient use of the lighting resources.

It can be seen that lighting a stage during a performance can be viewed as an art form which is best carried out by a human operator. However, to operate all of the required lights in a fully manually operated system is very difficult from the point of view of having enough space in the area surrounding the stage, and, even if it were possible to position enough operators in the area surrounding the stage, the costs to do so would be quite high.

It is a goal of the present invention to provide a method and system that overcomes at least one of the above mentioned problems. In particular, it is desirable to provide a system which will allow the input of a human operator to take cognisance of minor movements of performers on the stage and introduce a human input to the movement of the lights, whilst at the same time allowing a single operator to operate a plurality of the spotlights concurrently.

SUMMARY

The present invention, as set out in the appended claims, is directed to a user-operated spotlight system for lighting a performer on a stage; the user-operated spotlight system comprising at least one camera which points at the stage, a screen which displays an image of the stage captured by the at least one camera and a cursor, a screen cursor positioner which can be operated to move the cursor on the screen, a processor connected to the screen, and, a plurality of controllable spotlights which are connected to the processor and which plurality of controllable spotlights can be moved by a user moving the cursor on the screen.

In one embodiment there is provided a user-operated spotlight system for lighting a performer on a stage; the user-operated spotlight system comprising a screen which displays an image of the stage and a cursor, a screen cursor positioner adapted to be operated to move the cursor on the screen, a processor connected to the screen, and, a plurality of controllable spotlights which are connected to the processor and which plurality of controllable spotlights can be moved by a user moving the cursor on the screen.

The advantage of providing such a user-operated spotlight system is that a single user can operate a plurality of spotlights. This reduces the number of operators required for operating the various spotlights. Previously, manually operated spotlights required one operator for each spotlight. As the plurality of spotlights are operated by a user, the spotlights can be operated in fashion which suits the performer's needs and introduce a human element into the movement of the lighting which can add to the overall performance. For example, the operator could move the spotlights slightly to better illuminate a performer's raised hand. It will be appreciated that the system does not receive the data, and simply converts the position of a mouse cursor mathematically into a DMX position for the moving light or other protocol for a projector, camera pan-tilt system or scenic control system.

In a further embodiment, a pre-performance calibration stage is carried out. In one embodiment, in order to calibrate the user-operated spotlight system, at least two cursor positions on the screen displaying the stage are linked with at least two stage positions, whereby the cursor positions on the image of the stage relate to the actual positions on the stage itself. The calibration of at least two cursor positions with at least two stage positions is carried out for each of the plurality of spotlights, such that by pointing the cursor at a position on the image of the stage shown on the screen, at least some of the plurality of spotlights will be controlled to direct their beams towards that actual position on the stage itself. It will be appreciated that any problems/characteristics of the lens can be overcome using more reference points and applying the appropriate mathematical algorithm. In other words multiple calibration points for the system can be used in the set-up.

The system and method of the invention incorporates a calibration process where the system is provided with a reference position to mathematically calculate "numeric data" and convert into a protocol that a lighting fixture, motorised camera, or scenic control system can understand and in turn points to by moving its motors or the image as in the case of a projector.

In a further embodiment, camera faces the stage in the same direction that the audience faces the stage. In a further embodiment, the angle of the camera relative to the plane of the stage is provided in the calibration stage to allow the spotlights to focus at a position on the plane of the stage.

In a further embodiment, the screen cursor positioner is a mouse. In a further embodiment, the screen cursor positioner is a trackball. In a further embodiment, the screen cursor positioner is a trackpad. As a user moves the cursor on the screen using the screen cursor positioner, the spotlights are controlled to move their beams around the actual stage, following the movement of the cursor across the stage image on the screen.

In this way, a user can follow a performer around a stage in an unplanned movement route, and by keeping the cursor over the performer on the screen, the spotlights for illuminating that performer are controlled so as to always focus on the performer.

In a preferred embodiment, the cursor is kept over a performer's feet. In another embodiment, the user-operated spotlight system takes account of a performer's height and adjusts the focus and direction of the spotlights, associated with that performer, from the plurality of spotlights.

In a further embodiment, different sections of the stage can be accorded different heights relative to the plurality of spotlights, such that the plurality of spotlights will adjust to correctly focus together at the correct height for these different sections of stage.

In a further embodiment, the height of the camera relative to the plane of the stage is used in the calibration stage.

In a further embodiment, the distance of the camera from a centre point of the stage is used in the calibration stage.

In one embodiment a number of camera images can be stitched together to form a panoramic view of the stage in which the performance is taking place.

In one embodiment the system and the method is configured to automatically control a plurality of parameters of a moving light automatically. This control extends to any parameter that can adjust the light, for example Iris, Zoom, focus and colour. This control is based upon position in the performance space or preprogrammed location that illicit an automatic response from the system. The system and the method can be applied to video cameras, projection systems, scenic control systems and audio systems such as microphones.

In one embodiment the system is configured to compensate for variations in height of a stage structure. These items include ramps, steps and risers.

In one embodiment the system is configured with an intelligence and control instructions to current follow spotlights and configure said spotlight as a master follow spot and have any number of systems such as moving lights, projectors, scenic controls, performer flying systems all follow the spot of the light source.

In one embodiment the camera can be fixed and not move during operation.

In one embodiment the camera is mounted on a moving light and configured to move in tandem with the light itself.

In one embodiment the system is configured with "centering of the head" function by providing a control in the system that spins a head and then allows the operator to remove the non-concentricity of the rotation thereby increasing accuracy.

In one embodiment apparatus to cause the camera to "hang" vertically and then configured to further tilt the camera.

In one embodiment the system can employ software code or similar to activate or deactivate the light, camera, flying system, projector or other system that can be controlled and independently control these systems to carryout calibration or testing.

In one embodiment the system can control a light, camera, projector or other and independently move their axes to provide a calibration routine or system check routine for accuracy or performance.

In one embodiment the system is configured to perform compound moves of axes, or of systems in conjunction with each other such as lights, projection, flying and rigging systems in order to check accuracy or check function.

In one embodiment the system can perform an adaptive calibration, i.e. dive the light to a point and check with the operator if its location is accurate.

In one embodiment the system can be made to automatically perform a calibration routine for one or for any and all lights, projectors, cameras, flying and rigging systems.

In one embodiment the system is configured to work with a single video feed and or multiple video feeds switched in and out and or multiple video feeds stitched into one continuous video image.

In one embodiment the system can switch which lights it uses, or other systems operated by on board processor or an auxiliary lighting processor.

In one embodiment the system employs an infrared or other wavelength light source that overcome the natural limits of an operators eyesight.

In one embodiment the system can employ processing to place tags, or a similar notation, saved pre-set or similar on a screen or by memory recall to provide a point of reference in the instance of working in a black-out.

In one embodiment the system can be used in conjunction with video glasses with the system.

In one embodiment integration of 3D mapping with the system is performed.

In one embodiment there is provided an external hardware module to interface with the system to provide a dedicated hardware control for features of the software.

For example the external hardware module can be a lump of metal that looks and feels like a follow spot to operate but it is a remote control for the mouse or lighting desk, etc.—it just gives the "feel" of a follow spot. In one embodiment the hardware module can be incorporated into a flight case, for example an emulator. The emulator is dimensioned to point at a monitor—moving the cursor around—but by moving the screen it's pointing at away or nearer the operator one can essentially limit the travel of the emulator in the pan and tilt directions. This can be a feature for limiting how far an operator moves the system, can be used to "size the ergonomics" for different operators or indeed it can be used to position an operator in a seat at the correct distance from the screen to "smooth" out their movements.

It will be appreciated that the distance from the emulator to the screen can be set in such a way to make operation more ergonomic for the operator.

In one embodiment there is provided a user-operated spotlight system for lighting a performer on a stage; the user-operated spotlight system comprising:

an emulator adapted to communicate with at least one spotlight, a processor connected to the emulator, and, a plurality of controllable spotlights which are connected to the processor and which the plurality of controllable spotlights can be moved by a user moving the emulator to control the plurality of spotlights.

The emulator can be embodied as a hardware module and incorporated into an existing spotlight or follow spot, which in turn can be used to control a plurality of lights where the follow spot or existing spotlight acts as a master light control with the emulator incorporated therein.

In a further embodiment there is provided a method of operating a spotlight system for lighting a performer on a stage; the method comprising the steps of:

displaying an image of the stage on a screen and a cursor, configuring a screen cursor positioner to be operated to move the cursor on the screen, and connecting the screen and a plurality of controllable spotlights which plurality of controllable spotlights can be moved by a user moving the cursor on the screen.

There is also provided a computer program comprising program instructions for causing a computer program to carry out the above method which may be embodied on a record medium, carrier signal or read-only memory.

DETAILED DESCRIPTION OF EMBODIMENTS

The invention will be more clearly understood from the following description of some embodiments thereof, given by way of example only, with reference to the accompanying drawings, in which:

FIG. 4a is a diagrammatic view of a twin camera assembly as used in an embodiment of the present invention;

FIG. 4b is a diagrammatic view of a user-operated spotlight system in accordance with the twin camera embodiment of FIG. 4a, with the stage and camera angles and spotlight angles illustrated;

FIG. 5a is a diagrammatic view of a hardware setup for a user-operated spotlight system in accordance with the twin camera embodiment of FIG. 4a;

Figure 5A:
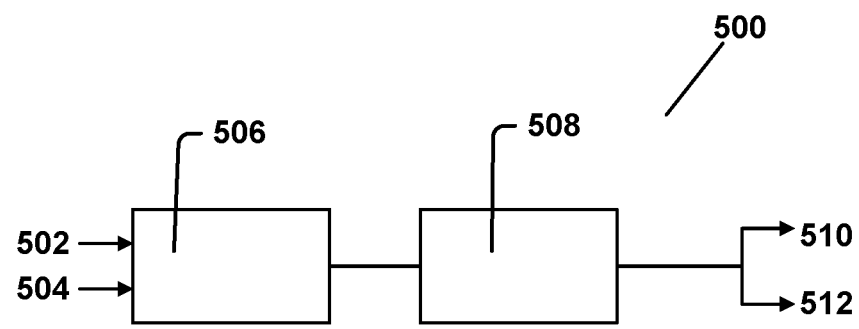
Figure 5B:
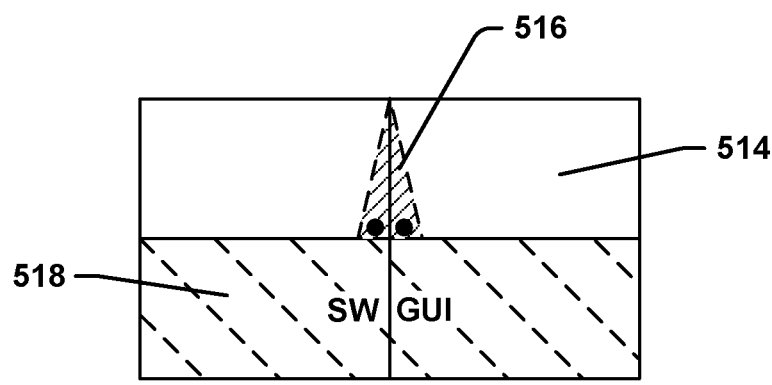
Figure 6:
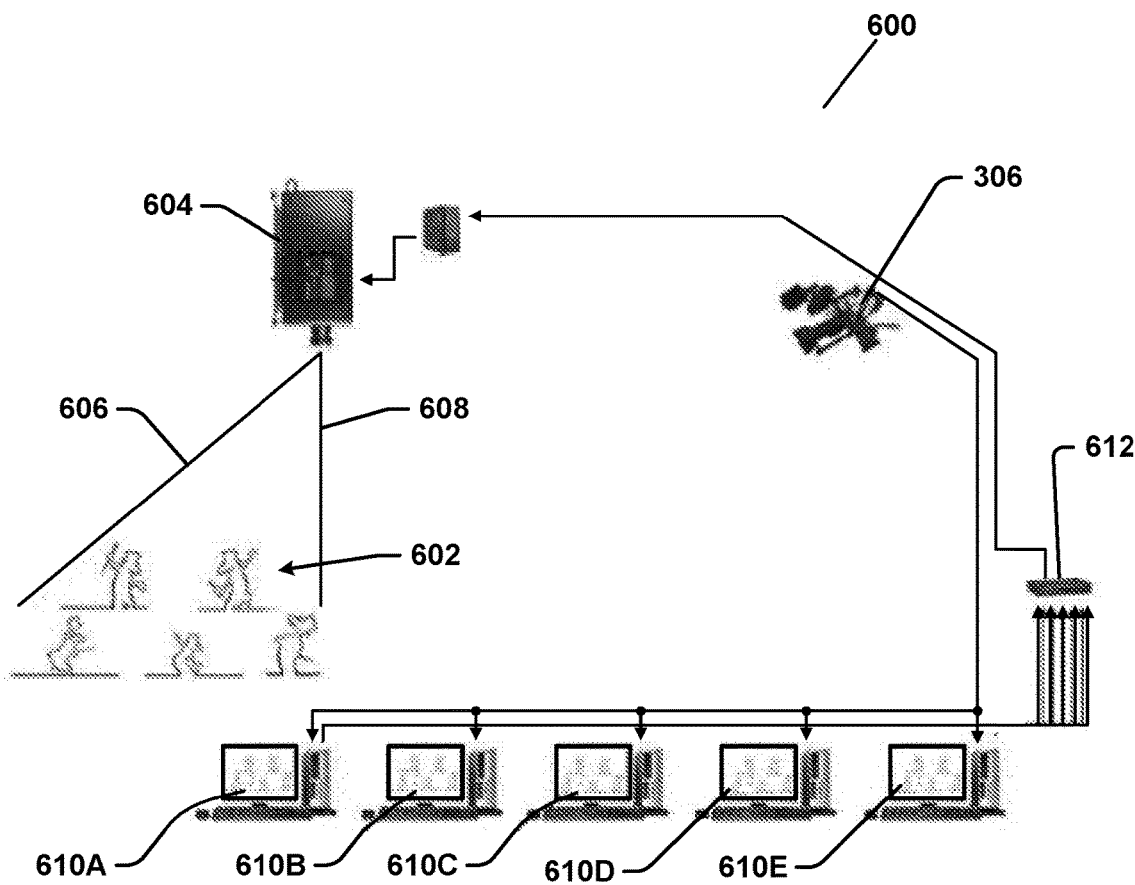

FIG. 5b is a diagrammatic view of a software graphic user interface as would be displayed on an operator screen for the user-operated spotlight system in accordance with the twin camera embodiment of FIG. 4a; and, FIG. 6 is a diagrammatic view of a user-operated spotlight system in accordance with an embodiment of the present invention, the user-operated spotlight system comprising a single camera, a single projector and a plurality of operator screens.

The present invention is a user-operated spotlight system effected by a video camera being mounted over a stage, at some angle, in order that the viewing angle of the camera covers the entire stage, so that entire stage is presented to a human operator on a computer screen, which displays the image captured by the camera via video stream. Therefore, a stage performer will be seen by the operator on a computer screen. The operator is directing moving light beams, which are referred to as light sources or spotlights also, to light the performer by placing a cursor which is also shown on the computer screen at the performer's feet. The present invention will receive the cursor position on the screen and will calculate the required amount of pan and tilt movements needed to direct the moving lights to light the stage performer at the point on the stage where the cursor is overlaying on the screen image on the stage on the computer screen. This provides the moving lights which are controlled the functionality of a conventional light source. When the stage performer moves, the operator will follow the performer's feet by moving the cursor on the screen to continue to overlay on the performer's feet, using a mouse or trackpad or such similar device, thus directing the moving light to follow the performer.

In essence, the present invention converts a screen cursor position to an associated stage position. The system is initially calibrated so that a cursor overlaying a point of the image of the stage shown on the screen will be associated with that actual position on the actual stage. Hence, the moving lights will be moved to focus their beams on that stage position when the cursor is moved to that associated screen position.

Figure 1:
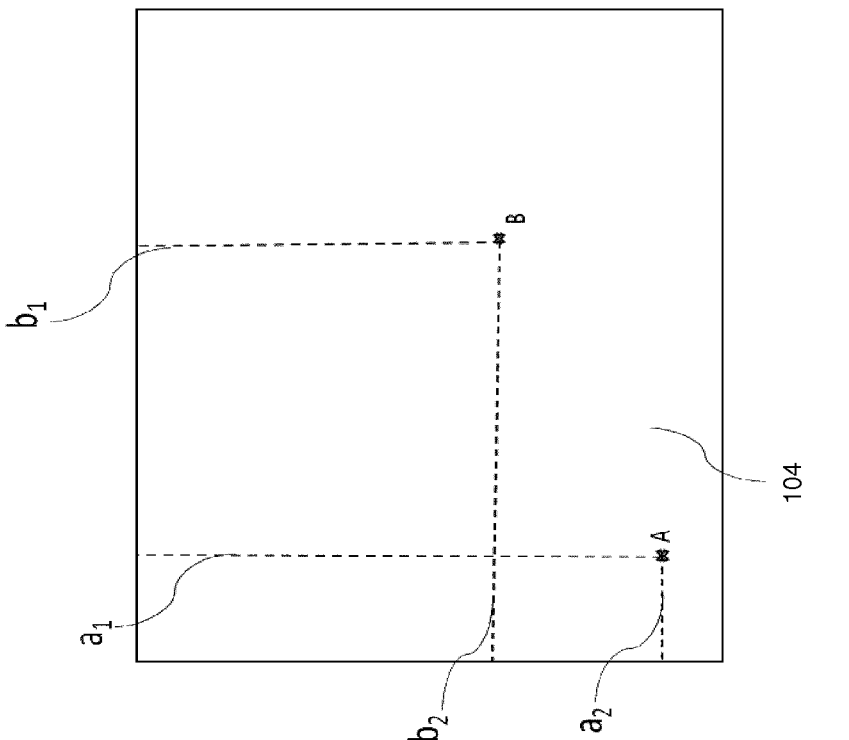
FIG. 1 is a diagrammatic view of a user-operated spotlight system in accordance with the present invention, showing a screen displaying an image of a stage and the actual stage itself.

Referring to FIG. 1, there is provided an operator screen 100. The screen 100 displays an image 102 of a stage, whereby the stage is located remotely from the screen 100. A cursor 106 is also displayed on the screen 100. FIG. 1 also shows the stage 104 itself.

Two points A and B are shown on the stage 104. The position on the stage of point A is given by the co-ordinates (a1, a2). A moving light, in the form of a spotlight would be able to direct its beam on point A when given the co-ordinates (a1, a2). The associated cursor position on the screen 100 is (x1, y1). Regarding point B, the stage position co-ordinates are (b1, b2) associated with (x2, y2). As can be seen, due to the perspective view of the stage 104 on the screen 100, the values y1 and y2 are relative close together, when in fact the actual co-ordinates for these positions in that same axis a2 and b2 are relative far apart. During the calibration process, the cursor positions on the screen, which in essence are the pixel positions on the screen, must be associated with the actual stage co-ordinates through the development of a translational function which will convert the cursor position on the screen to the correct stage position. If the cursor is positioned on the screen 100 to overlay the frontmost, leftmost point on the stage 104, then the cursor position co-ordinates should be translated and converted to the frontmost, leftmost stage position co-ordinates. This conversion is carried out in a processor (not shown) which forms part of the present invention. The stage position co-ordinates from the processor are transmitted to the plurality of moving lights (not shown) so as to move the moving lights to focus their beams on the frontmost, leftmost stage position.

It will be readily appreciated that the calibration is crucial to the present invention. The calibration must be completed after the camera is installed in a fixed position as the translational function derived through the calibration is based on the pixel of the view of the screen. Any change to the camera angle or position will upset this derived translational function and the calibration would have to be undertaken again.

After calibration, and when in use, the user-operated spotlight system allows a user, also referred to as an operator throughout this specification, to point the cursor 106 on the screen 100 to a position over the image 102 of the stage 104 and cause at least some of a plurality of spotlights (not shown) which are associated to that cursor 106 to move so as to illuminate that associated position on the stage 104 itself.

Figure 2:
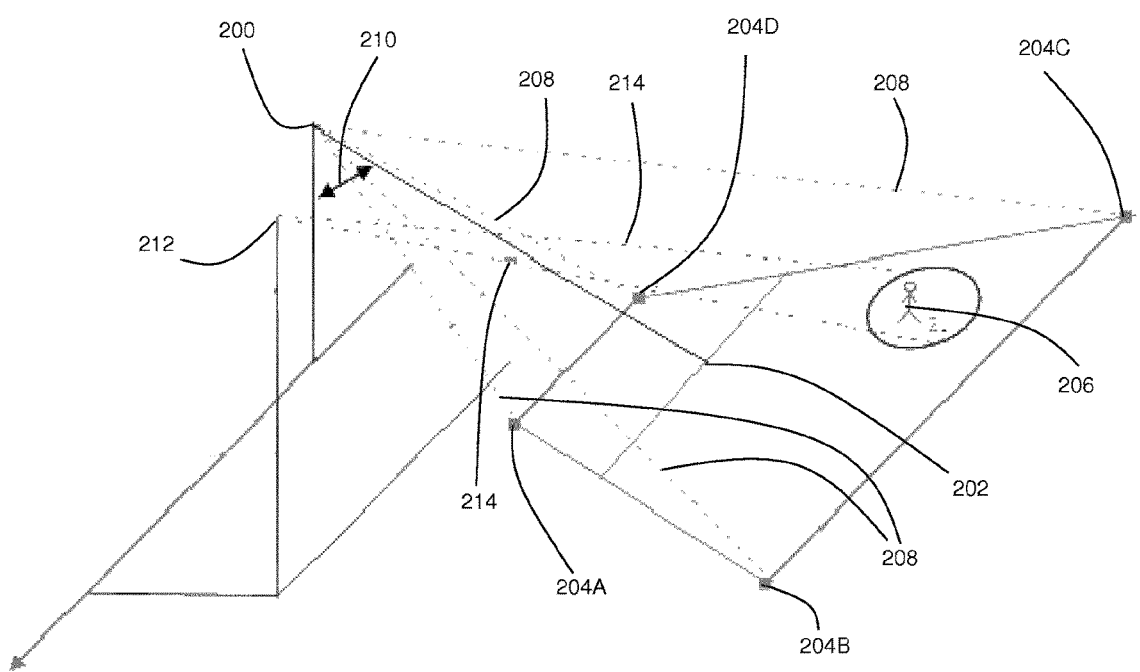
FIG. 2 is a diagrammatic view of a user-operated spotlight system in accordance with the present invention, showing a stage and camera angles and spotlight angles.

Referring to FIG. 2, there is provided a camera position 200 shown relative to a stage. The camera is directed to capture a centre point 202 of the stage in a central portion of the camera's field of vision. The stage is defined by corner points 204A, 204B, 204C, 204D and a performer 206 is shown ion the stage. The field of vision of the camera must capture at least all of the stage. The field of vision of the camera is indicated by field of vision lines 208. The camera angle 210 relative to the planar surface of the stage is shown.

A spotlight position 212 is shown such that the spotlight can be moved to illuminate the performer 206 on the stage. The focussed beam of the spotlight is indicated by lines 214.

The video camera is mounted at an angle 210, which is no greater than 45°, towards the stage. This angle 210 is used by the user-operated spotlight system in the mathematical calculation of the coordinate calculated between the cursor position on an operator screen, which may be given in terms of the pixel positions, and, a stage which is viewed by the video camera. Each screen pixel is calculated as a pixel that is transferred onto the stage. The camera displays the video on the screen from pixel (0, 0) to pixel (p1, p2). The uppermost pixel value is dependent on the screen resolution of the operator screen. Greater resolution will ultimately allow the present invention to have a greater and finer control of the moving lights over the stage. During calibration, the video camera horizontal field of view is used and an operator will measure the video camera angle so that each pixel on the screen is translated as a position on the stage. For example, an upper left pixel on the operator screen may be given as (0, 0) and this would be transferred as the upper left corner 204C of the stage. This calculated position co-ordinates is a translation function which is derived for each system setup as the views, on a pixel by pixel basis will be unique to each camera position setup.

Figure 3:
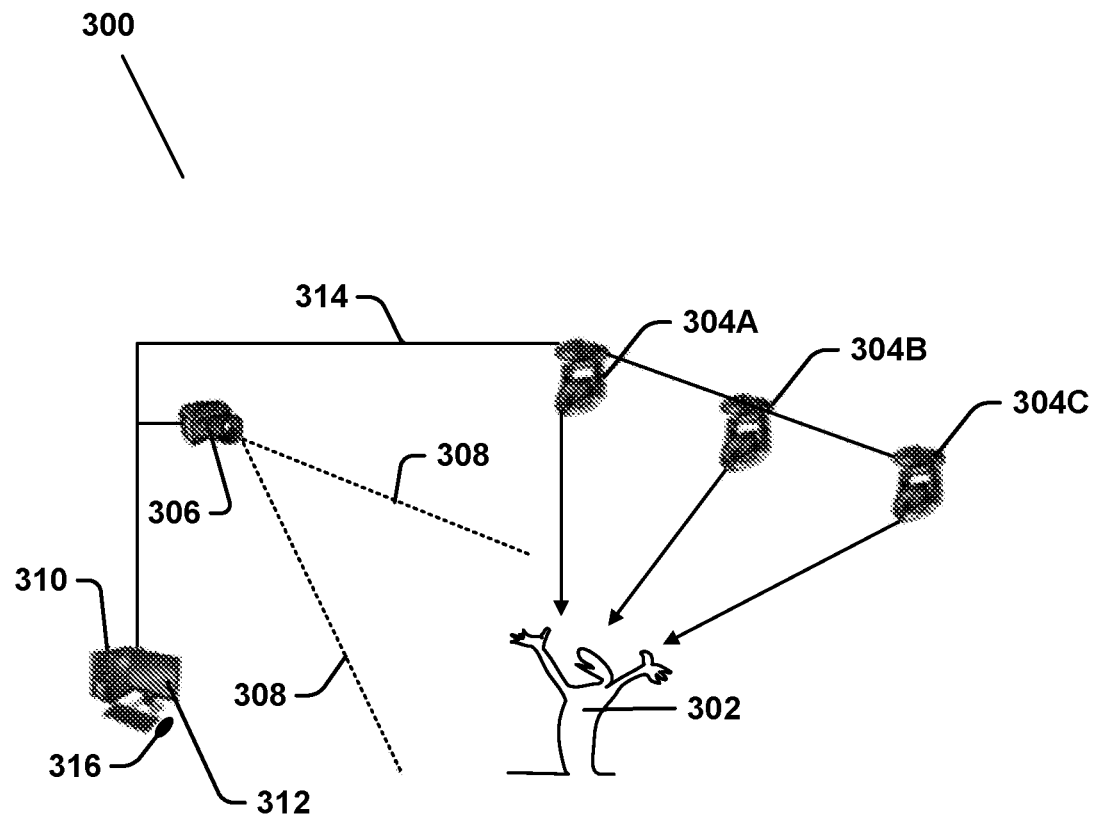
FIG. 3 is a diagrammatic view of a user-operated spotlight system in accordance with the present invention, the user-operated spotlight system comprising a single camera and plurality of moving spotlights.

With reference to FIG. 3, there is provided a user-operated spotlight system indicated generally by reference numeral 300. The user-operated spotlight system 300 is used for lighting a performer 302. The user-operated spotlight system 300 comprises one camera 306 which points at the performer 302 on a stage. The field of view of the camera 306 is defined by field of view lines 308 and during the setup it would be ensured that the entire stage sections visible to the audience would also be displayed on an operator screen 312.

A plurality of moving lights 304A, 304B, 304C which are controllable by the user-operated spotlight system 300 are connected to a processor 310 by a connection 314. In this example, in line with the DMX512 protocol, the plurality of moving lights 304A, 304B, 304C are connected in a daisy-chain arrangement. The processor 310 is connected to an operator screen 312. A screen cursor positioner 316 is provided to allow an operator (not shown) to move a cursor on the screen. The co-ordinates of the cursor position are calculated by the processor 310 into stage position co-ordinates which can be understood by the plurality of moving lights 304A, 304B, 304C. In one embodiment, this calculation outputs DMX512 co-ordinates which are understood by the plurality of moving lights 304A, 304B, 304C. The stage position co-ordinates are transmitted to the plurality of moving lights 304A, 304B, 304C which are then automatically moved to illuminate the stage position. The screen 312 displays an image of the stage captured by the camera 306. In this manner, the plurality of plurality of moving lights 304A, 304B, 304C are moved by an operator moving the cursor on the screen 312.

The plurality of moving lights 304A, 304B, 304C must be calibrated before they can be used for illuminating the performer 302. To accomplish this pre-performance calibration setup, for every moving lights separately, two points on the stage are used in a following manner:

using pan and tilt values, the operator will move a light beam to any position on the stage;

this first position will have x and y coordinates in a stage pixels system, and this first position is marked as T1, for example;

using only tilt values, the operator will move the light beam to another position on the stage;

this second position will again have x and y coordinates in the stage pixels system, and this second position will be marked as T2, for example;

the calibration procedure has now marked two points (T1, T2) on the stage and knows the number of pan and tilt values that must be used for the particular moving light being calibrated to move a light beam from point T1 to point T2. It will be appreciated more than two points can be used to increase accuracy;

using these known values, coordinates for a moving light neutral position (which is when the moving light points directly down towards the stage along its longitudinal axis; in DMX512 values, this would be pan=128, tilt=128) are calculated as a home point in the stage pixel coordinate system;

using the home point coordinates, the required pan value and tilt value to direct the moving light at any point on the stage is calculated.

Using this calibration procedure any number of moving lights in any position regarding the stage can be setup as a moving light source. Each light will be positioned at different location in the gantry and in areas above and surrounding the stage, so the calibration must be carried out for each light individually. Each light will have its own mathematical function to convert pixel positions to a particular tilt and pan for that light so that it is directed towards the stage position.

If a single camera cannot capture the stage using its field of view, a twin camera approach can be taken. As see in FIG. 4a, there is provided a twin camera assembly indicated generally by reference numeral 400. A pair of camera 402A, 402B are mounted on a stand 404. Looking now at FIG. 4b, the twin camera assembly position 406 is arranged such that the cameras are held at a camera angle 408 from the vertical. A first field of view 410 for a first camera 402B and a second field of view 412 for a second camera 402A are shown. These fields of view 410, 412 cover the stage 414, which is shown in hatched lining. An overlap section 416 will exist between the fields of view 410, 412. An angle 418 between the direction of fields of view of the cameras is also shown. These angles are used during the setup when establishing the mathematical functions for each of the moving lights (not shown).

Referring to FIG. 5a, there is provided a multi-camera setup 500 which comprises a multi-channel viewer 506 which receives feed from at least two camera feeds 502, 504. The multi-channel feed is sent to a HDMI module 508 and is output as at least two operator screens outputs 510, 512. The operator screen view is shown in FIG. 5b and comprises the two camera feeds, which combine to give a stage view 514 with the overlap 516 section. A graphic user interface with various lights controls such as dimmers and so on can also be shown on screen I a GUI section 518.

Turning now to FIG. 6, wherein like parts previously described have been assigned the same reference numerals, an alternative embodiment of the user-operated spotlight system indicated generally by reference numeral 600 is disclosed whereby a plurality of performers indicated generally by reference numeral 602 are shown on a stage. The performers 602 are illuminated by a stationary projector 604 instead of a plurality of moving lights. The stationary projector 604 must be capable of illuminating at point on the stage with the field of projection shown between field lines 606 and 608 in FIG. 6. The camera 306 captures the stage as before and a multitude of operator screens 610A, 610B, 610C, 610D, 610E are operated by a separate operator each, with each operator being assigned to a particular performer. The cursor position for each of the operator screens 610A, 610B, 610C, 610D, 610E is taken and accumulated by a processor 612 to produce an image pattern of white spots, which act as the lights, on a black background. This generated image will contain the spots for each of the performers in the position prescribed by the cursor positions on the operator screens 610A, 610B, 610C, 610D, 610E. The projector 604 is then feed this information and projects the white spots accordingly.

Instead of a projector, for multiple performers, moving lights can be used. The plurality of moving lights would be sub-divided into sets for each of the performers, with the cursor on each of the operator screens 610A, 610B, 610C, 610D, 610E being associated with one of each of the sets of the moving lights respectively.

It will be appreciated that any suitable type of light source can be used, provided the beam(s) of that light source can be moved about a stage.

It is also envisaged that a plurality of CCTV cameras could be controlled in a similar fashion by causing a plurality of the camera to focus on a particular point in space, where that point in space is shown on an operator screen and a cursor on the screen can be used to change the point in space where the CCTV camera are focussed.

In yet another embodiment, a plurality of microphones could be controlled in a similar manner to act together to focus in on a point on a games field, or sports field, or theatre stage.

The terms "comprise" and "include", and any variations thereof required for grammatical reasons, are to be considered as interchangeable and accorded the widest possible interpretation. It will be understood that the components shown in any of the drawings are not necessarily drawn to scale, and, like parts shown in several drawings are designated the same reference numerals. It will be further understood that features from any of the embodiments may be combined with alternative described embodiments, even if such a combination is not explicitly recited hereinbefore but would be understood to be technically feasible by the person skilled in the art.

The embodiments in the invention described with reference to the drawings comprise a computer apparatus and/or processes performed in a computer apparatus or processor. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

The invention is not limited to the embodiments hereinbefore described which may be varied in both construction and detail.

The invention claimed is:

1. A user-operated spotlight system for lighting a performer on a stage; the user-operated spotlight system comprising:
    a screen configured to display an image of the stage;
    a screen cursor positioner operable to move a cursor displayed on the screen, and
    a processor connected to the screen, and configured to:
        move a plurality of controllable spotlights that are coupled to the processor, wherein the plurality of controllable spotlights moves when a user moves the cursor on the screen; and
        calibrate the user-operated spotlight system by linking one or more cursor positions on the image of the stage with one or more corresponding positions on the stage.

2. The system of claim 1 wherein the user-operated spotlight system is calibrated before a performance involving the performer on the stage.

3. The system of claim 1, further comprising:
a camera, wherein the user-operated spotlight system is calibrated based on a height of the camera relative to a plane of the stage.

4. The system of claim 1, further comprising:
a camera, wherein the user-operated spotlight system is calibrated based on a distance of the camera from a centre point of the stage.

5. The system of claim 1, further comprising:
at least one camera, wherein the at least one camera and an audience face the stage in a same direction.

6. The system of claim 1, further comprising:
a camera positioned at an angle relative to a plane of the stage, wherein the plurality of controllable spotlights are focussed at a position on the plane of the stage that is determined based on the angle of the camera at which the camera is positioned.

7. The system of claim 1, wherein beams of the plurality of controllable spotlights move around the stage responsive to movement of the cursor on the screen.

8. The system of claim 1 wherein the screen cursor positioner is a mouse.

9. The system of claim 1 wherein the screen cursor positioner is a trackball.

10. The system of claim 1 wherein the screen cursor positioner is a trackpad.

11. The system of claim 1 wherein the screen cursor positioner is an emulator.

12. The system of claim 1 wherein the cursor is kept over a performer's feet.

13. The system of claim 1, wherein the user-operated spotlight system is configured to adjust focus and direction of one or more spotlights in the plurality of controllable spotlights based on height of a performer who is associated with the one or more spotlights.

14. The system of claim 1, wherein the user-operated spotlight system is configured to adjust focus of the plurality of controllable spotlights based on different heights associated with different sections of the stage relative to the plurality of controllable spotlights.

15. A user-operated spotlight system for lighting a performer on a stage, comprising:
a screen which displays an image of the stage and a cursor;
a screen cursor positioner adapted to be operated to move the cursor on the screen;
a processor connected to the screen;
a plurality of controllable spotlights which are connected to the processor, wherein the plurality of controllable spotlights moves when a user moves the cursor on the screen; and
a module adapted to calibrate the user-operated spotlight system, such that at least two cursor positions on the screen displaying the stage are linked with at least two stage positions, whereby the cursor positions on the image of the stage relate to the actual positions on the stage itself.

16. A user-operated spotlight system for lighting a performer on a stage, comprising:
a screen that displays an image of the stage and a cursor;
a screen cursor positioner adapted to be operated to move the cursor on the screen;
a processor connected to the screen;
a plurality of controllable spotlights connected to the processor, wherein the plurality of controllable spotlights move when a user moves the cursor on the screen; and
a module adapted to calibrate at least two cursor positions with at least two stage positions for each of the plurality of spotlights, such that at least some of the plurality of spotlights are controlled to direct their beams towards an actual position on the stage when the cursor is pointed at a corresponding position on the image of the stage shown on the screen.

17. A method of operating a spotlight system for lighting a performer on a stage; the method comprising the steps of:
displaying an image of the stage on a screen;
configuring a screen cursor positioner to be operated to move a cursor that is displayed on the screen;
connecting the screen and a plurality of controllable spotlights, wherein the plurality of controllable spotlights are moved in response to movements of the cursor that is displayed on the screen; and
calibrating one or more cursor positions with one or more corresponding stage positions for each of the plurality of spotlights, wherein at least some of the plurality of spotlights are controlled to direct their beams towards a position on the stage when the cursor is pointed at a corresponding position on the image of the stage shown on the screen.

18. A non-transitory storage medium comprising a processor to:
display an image of a stage;
configure a cursor positioner that is operated to cause a cursor to move over the image of the stage;
associate the image of the stage with a plurality of controllable spotlights, wherein the plurality of controllable spotlights move in response to movements of a cursor displayed with the image of the stage; and
calibrate one or more cursor positions with one or more corresponding positions on the stage for each of the plurality of spotlights, wherein a beam of at least one of the plurality of spotlights is directed towards a position on the stage when the cursor is located at a corresponding position on the image of the stage.

19. A user-operated spotlight system for lighting a performer on a stage, the user-operated spotlight system comprising:
an emulator adapted to communicate with at least one controllable spotlight; and
a plurality of controllable spotlights;
a processor connected to the emulator and to the plurality of controllable spotlights, wherein the processor is configured to:
cause the plurality of controllable spotlights to move in response to movements of the emulator; and
calibrate one or more cursor positions with one or more corresponding positions on the stage for each of the plurality of controllable spotlights, wherein a beam of at least one of the plurality of controllable spotlights is directed towards a position on the stage when a cursor controlled by the emulator is located at a corresponding position on an image of the stage.

20. The user-operated spotlight system of claim 19, wherein the emulator comprises a remote control device adapted to emulate a follow spotlight.

* * * * *

UNITED STATES PATENT AND TRADEMARK OFFICE
CERTIFICATE OF CORRECTION

| | |
|---|---|
| PATENT NO. | : 10,405,413 B2 |
| APPLICATION NO. | : 15/735157 |
| DATED | : September 3, 2019 |
| INVENTOR(S) | : Liam Feeney |

Page 1 of 1

It is certified that error appears in the above-identified patent and that said Letters Patent is hereby corrected as shown below:

On the Title Page

Insert item (73), Assignee information --3D STAGE TRACKER LIMITED, Dublin, Ireland--

Signed and Sealed this
Twenty-first Day of April, 2020

Andrei Iancu
*Director of the United States Patent and Trademark Office*